(12) United States Patent
Mohrschladt et al.

(10) Patent No.: US 6,326,460 B1
(45) Date of Patent: Dec. 4, 2001

(54) METHOD FOR EXTRACTING POLYAMIDE PARTICLES

(75) Inventors: Ralf Mohrschladt, Schwetzingen; Volker Hildebrandt, Mannheim; Volker Warzelhan, Weisenheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/622,307

(22) PCT Filed: Feb. 19, 1999

(86) PCT No.: PCT/EP99/01089
§ 371 Date: Aug. 16, 2000
§ 102(e) Date: Aug. 16, 2000

(87) PCT Pub. No.: WO99/43407
PCT Pub. Date: Sep. 2, 1999

(30) Foreign Application Priority Data

Feb. 27, 1998 (DE) ............................................. 198 08 442

(51) Int. Cl.$^7$ .................................................. C08G 69/46
(52) U.S. Cl. ........................... 528/492; 528/422; 528/499
(58) Field of Search ...................................... 528/422, 492, 528/499

(56) References Cited

U.S. PATENT DOCUMENTS 4,978,743   12/1990   Selbeck et al. ...................... 528/499

FOREIGN PATENT DOCUMENTS

| 2501348 | 7/1976 | (DE) . |
| 3534817 | 4/1987 | (DE) . |
| 289471 | 5/1991 | (DE) . |
| 4324616 | 1/1995 | (DE) . |
| 19505150 | 8/1996 | (DE) . |
| 308774 | 3/1989 | (EP) . |
| 7226438 | 4/1968 | (JP) . |

OTHER PUBLICATIONS

Derwent Abstract AN–95–078098 (JP 930172565, Jun. 18, 1993).

*Primary Examiner*—Rabon Sergent
(74) *Attorney, Agent, or Firm*—Keil & Weinkauf

(57) ABSTRACT

Polyamide particles, or polymer particles comprising polyamides, are extracted with aqueous solutions of aminonitriles and optionally further polyamide-forming monomers, polyamide-forming oligomers or mixtures thereof.

6 Claims, 3 Drawing Sheets

METHOD FOR EXTRACTING POLYAMIDE PARTICLES

This invention relates to a process for extracting polyamide particles, or polymer particles comprising polyamides, with aqueous extractants.

As-polymerized polyamides and especially nylon-6 contain low molecular weight extractables comprising monomers and oligomers because of the chemical equilibria which develop in the polymer melt. To prevent any impairment of product quality and of processing properties, for example during injection or extrusion molding or during spinning, the extractables content has to be lowered. The requisite extraction is usually carried out with water at elevated temperatures, as described in DE-A 2 501 348, for example. The aqueous extract is concentrated and recycled into the polymerization.

To ensure adequate extraction of the polyamide and especially a diminishment of critical oligomers and especially dimers frequently requires long residence times in the extraction stage and hence large extraction columns, which not only appreciably raises the level of capital investment required but also adversely affects the flexibility of the process.

Extracting polyamide chips with caprolactam, as described in JP-A-72 26 438, for example, is disadvantageous, since caprolactam is a comparatively costly material and need not necessarily be available for use.

It is an object of the present invention to provide an extraction process which, on the one hand, shortens the extraction time compared with extraction with pure water and improves the extraction efficiency and, on the other, ideally dispenses with the use of caprolactam as extracting solvent.

We have found that this object is achieved according to the invention by a process for extracting polyamide particles, or polymer particles comprising polyamides, with aqueous extractants, which comprises using aqueous solutions of aminonitriles and optionally further polyamide-forming monomers, polyamide-forming oligomers or mixtures thereof as aqueous extractants.

The extraction is carried out by first contacting the polyamide particles, or polymer particles comprising polyamides, especially the polymer chips or similar shaped articles, with the extractant in order that the undesired low molecular weight constituents may be extracted from the chips. In a further step, the chips are removed from the extractant and freed from extractant residues, for example by rinsing with water. If desired, a further extraction of the chips with or without the addition of aminonitrile or polyamide-forming monomers or oligomers may take place. Depending on the desired product specification, extraction quality can be set within wide limits through the combination of the aforementioned steps as a function of equipment preconditions and the chosen parameters such as extractant concentration, chip/extractant ratio, temperatures and residence times.

The extraction of the invention may be carried out in one or more stages, depending on the equipment available. The aforementioned stages and their sequence may be carried out either batchwise, i.e., in succession in a single reactor, or continuously, i.e., simultaneously in successive reactors. It will be appreciated that it is also possible for some of the stages to be carried out continuously and the remaining stage(s) batchwise.

If the extraction is carried out continuously, the extractant and the polymer can pass both cocurrently and countercurrently. Preferably, the extraction is carried out counter currently i.e., the polyamide particles, or polymer particles comprising polyamides, and the aqueous extractant are passed countercurrently.

In a preferred embodiment, the extraction is carried out in a plurality of stages, and the extractants used in the different stages have different compositions. It is possible, for example, to carry out a preextraction with an extractant comprising aminonitrile, polyamide-forming monomers and/or oligomers and water, followed by an extraction stage which is free of aminonitrile, monomers and/or oligomers. The advantage with this embodiment is the reduction in the influence of impurities or, to be more precise, the avoidance of chip surface contamination due to the extractant. This two-stage embodiment is preferably carried out in a single apparatus.

The polyamide chips obtained after the polymerization and subsequent pelletization stage are fed to a continuous extraction column via a transportation water circuit. The chips are separated from the transporting water by a separating means (a sieve) and fall into the extractor head. The chips pass downwardly through the extraction tower under gravity and are freed along the way from low molecular weight constituents by extraction. Extracting solvent or water is continuously added at the base of the extraction column and passes upwardly through the extraction column in countercurrent, becoming loaded with monomers and oligomers on the way. The laden extractant is taken off at the top of the column and educted as extract water efflux. If desired, this is followed by an extract water workup or a recycle into the feed stream.

The extractant used is an aqueous solution of aminonitriles and optionally polyamide-forming monomers and/or polyamide-forming oligomers. The aminonitrile content in the extractant is chosen in such a way that complete miscibility is present in the extractant used, i.e., no separation occurs in the extractant. The level of aminonitriles, polyamide-forming monomers and polyamide-forming oligomers suitably totals from 5 to 95% by weight, based on the total weight of the aqueous solution. The aminonitrile concentration is within the range from 1 to 100% by weight, preferably within the range from 30 to 100% by weight, particularly preferably within the range from 50 to 100% by weight, based on the total weight of the nonaqueous compounds. The concentration of polyamide-forming monomers is within the range from 0 to 99% by weight, preferably within the range from 0 to 70% by weight, particularly preferably within the range from 0 to 50% by weight, based on the sum total of nonaqueous compounds. The concentration of polyamide-forming oligomers is within the range from 0 to 60% by weight, preferably within the range from 0 to 40% by weight, particularly preferably within the range from 0 to 20% by weight, based on the sum total of nonaqueous compounds. If at least 1% by weight, preferably at least 5% by weight, of further monomers and/or oligomers is present, the amount of aminonitriles decreases accordingly. Preferably, no further monomers and/or oligomers are present.

Two possible extraction columns are illustrated in the drawing in FIGS. 1/2 and FIG. 3, respectively. The column can also represent a combination of the two variants.

BRIEF DESCRIPTION OF DRAWINGS

FIG. 1 schematically illustrates by way of example an extraction column for the process of the present invention. Said extraction column 1 comprises a first (upper) tubular zone 2 and a second (lower) tubular zone 3, which are connected to each other via a funnel-shaped section 14. The ratio of the length of said first zone 2 to that of said second zone 3 is generally within the range from 1:5 to 5:1, preferably within the range from 1:2 to 2:1. The ratio of the tube diameter of said first zone 2 to that of said second zone 3 is generally within the range from 8:1 to 2:1, preferably within the range from 6:1 to 3:1.

Figure 1:
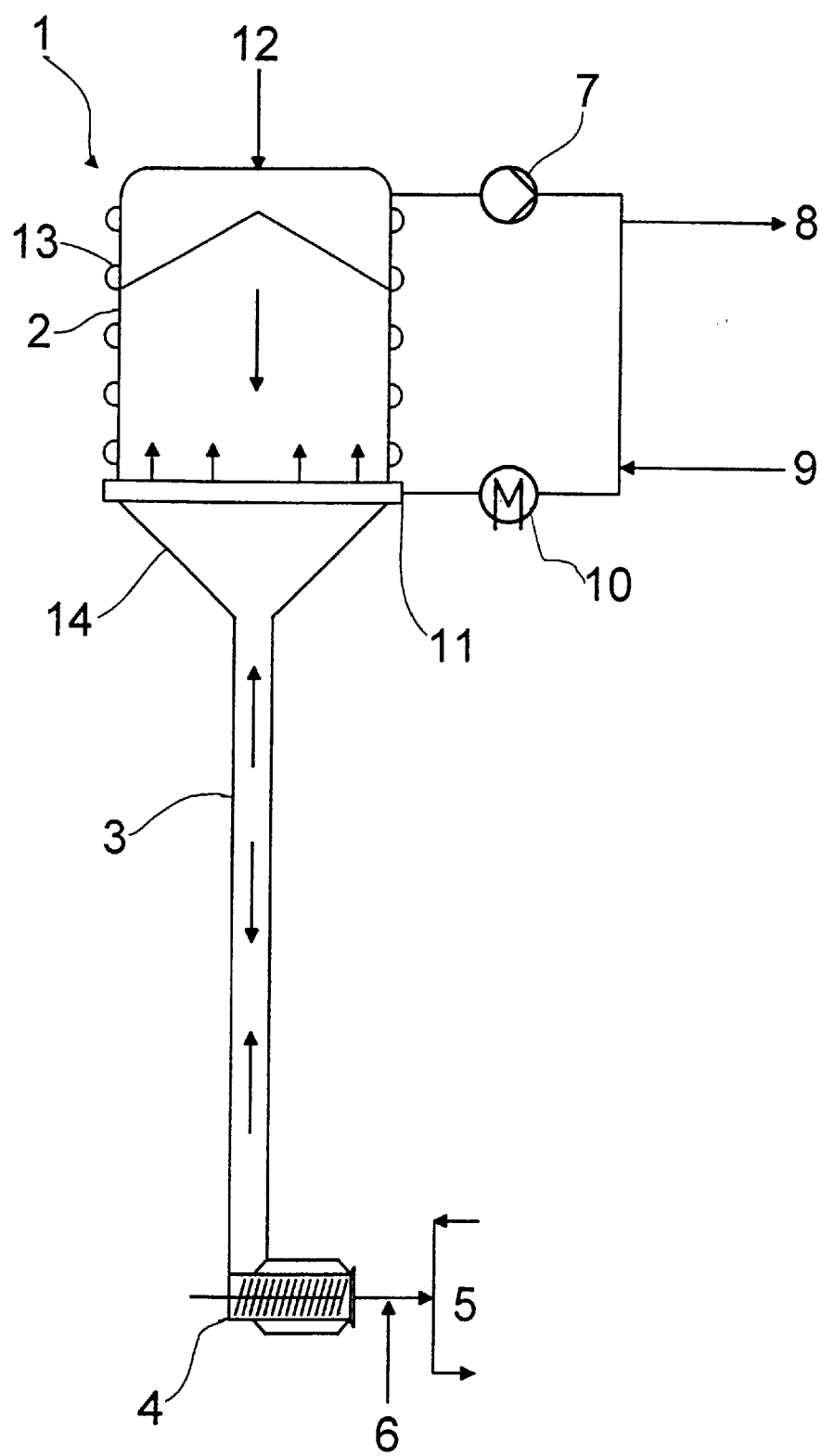
FIG. 1 shows a schematic of a first embodiment of an extraction column for the process of the present invention.

The polyamide chips 12 are introduced into said first zone 2 from the top, pass through it downwardly and then through said tubular second zone 3 and are then discharged via the discharge screw 4 into the transportation water circuit 5. Fresh water 6 is fed by said discharge screw 4 into said extraction column 1 as required. On passing through said extraction column 1, the water initially picks up monomer in said second zone 3 and then mixes in the bottom part of said first zone 2 with the extractant which is recirculated therein. This is removed in the top part of said first zone 2 by a pump 7, passed through a heat exchanger 10 which maintains the temperature within the desired range and is reintroduced through a perforated plate 11 in the bottom region of said first zone 2. Some of the extractant is removed at 8 and sufficient aminonitrile is supplied via 9 and sufficient water via 6 for the aminonitrile concentration in the extractant to be maintained within the desired range. Said upper zone 2 can optionally be additionally heated by jacketed tubes 13, whereas said second zone 3 is not externally heated, but may optionally be cooled.

Figure 2:
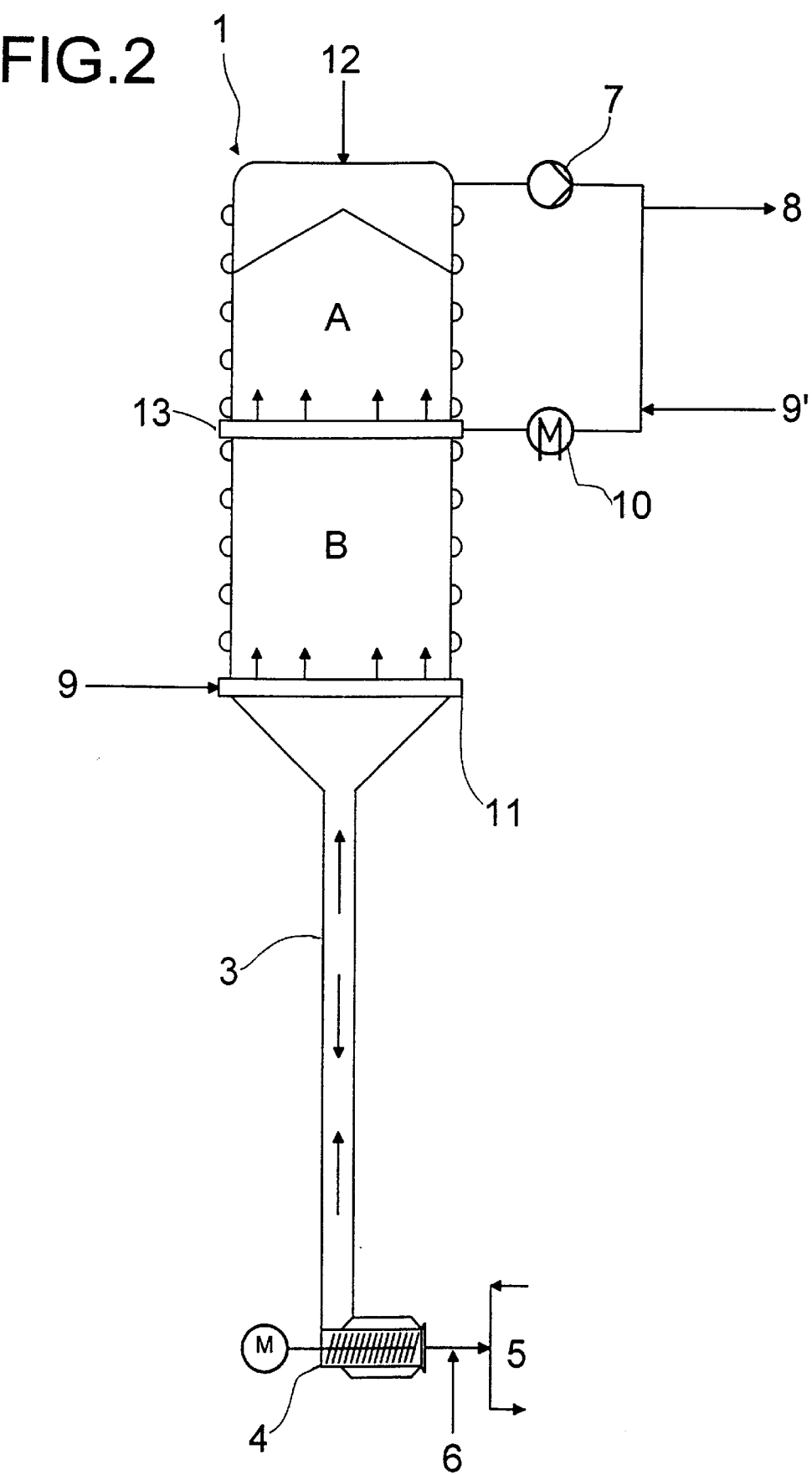
FIGS. 2 and 3 show schematics of further embodiments of an extraction column for the process of the present invention.

A further embodiment of an extraction column useful for the process of the present invention is shown in FIG. 2. Said extraction column 1 comprises a first (upper) zone 2 and a second (lower) zone 3. The ratio of the length of said first zone 2 to that of said second zone 3 is generally within the range from 1:5 to 5:1, preferably within the range from 1:2 to 2:1. The ratio of the tube diameters is as specified for FIG. 1. The regions A and B extend over roughly the same length.

The extraction proceeds in principle as described for FIG. 1. The only difference is that the extractant circuit includes only the top part A of said first zone 2, i.e., the extractant is withdrawn in the top region of said first zone 2 and reintroduced into its middle region by a second annular nozzle 13. Fresh aminonitrile is added at 9 via a first annular nozzle 11, which is located in the bottom region of said first zone 2. Some of the aminonitrile can also be introduced directly into the top circuit at 9. This way, the aminonitrile gradient in the extractor can be influenced in a specific manner. The polyamide chips 12 are thus initially treated in said top region A with a recirculating extractant and then in said bottom region B with aminonitrile in countercurrent. This provides a polyamide having a particularly low dimer content (<0.05%).

Figure 3:
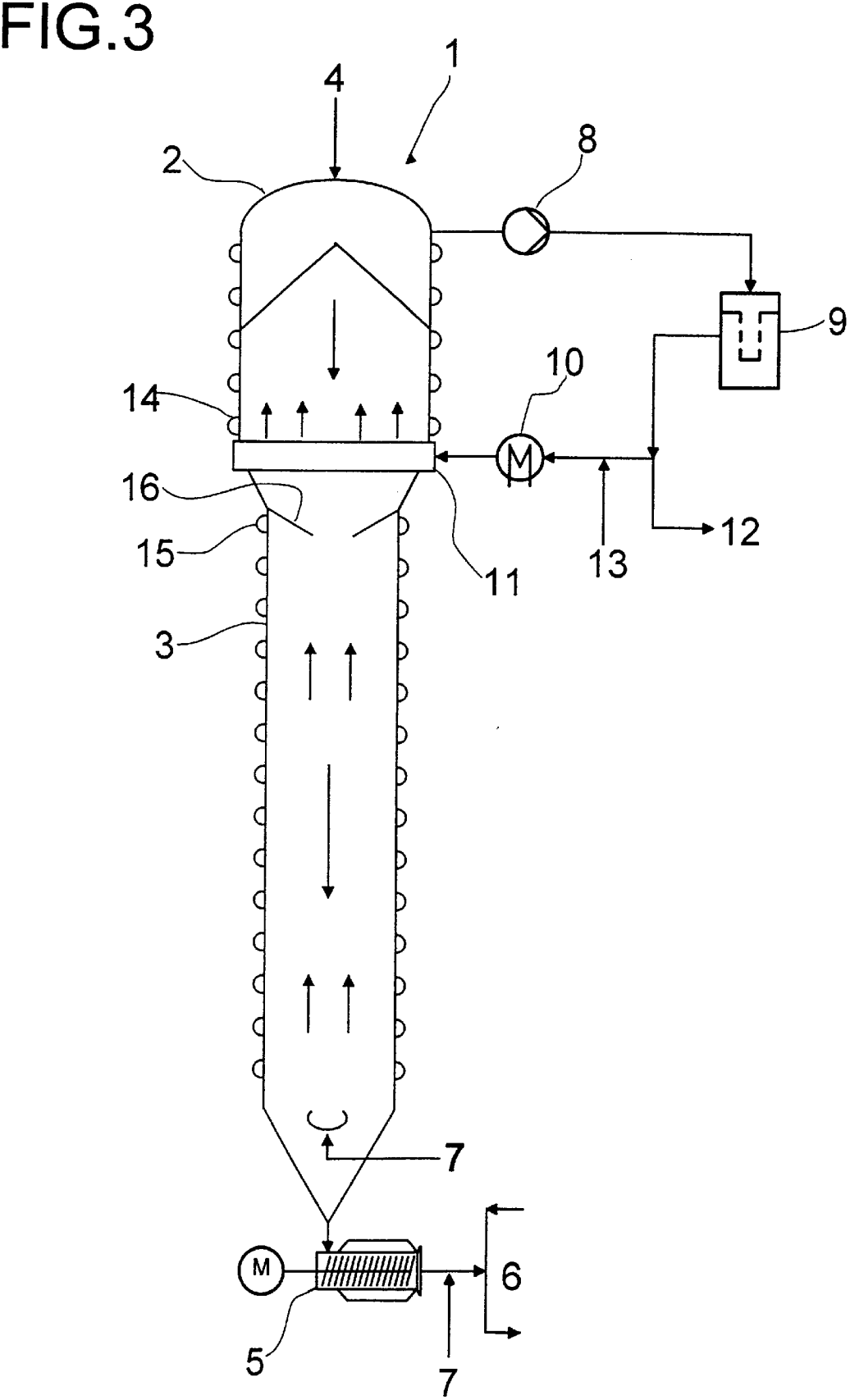

FIG. 3 schematically illustrates by way of example an extraction column for the process of the present invention. Said extraction column 1 comprises a first (upper) zone 2 and a second (lower) tubular zone 3. The ratio of the length of said first zone 2 to that of said second zone 3 is generally within the range from 0.05:1 to 1:1, preferably within the range from 0.1:1 to 0.3:1. The polyamide chips 4 are introduced into said first zone 2 from the top, pass through it downwardly and then through said tubular second zone 3 and are then discharged via the discharge screw 5 into the transportation water circuit 6. Water 7 is fed by said discharge screw 5 and via an annular nozzle at the base of the extractor upwardly into said extraction column 1. On passing through said extraction column 1, the water initially picks up aminonitrile in said second zone 3 and then mixes in the lower part of said first zone 2 with the extractant which is recirculated therein. This is removed in the upper part of said first zone 2 by a pump 8, filtered in the filter 9, passed through a heat exchanger which maintains the temperature within the desired range and reintroduced via an annular nozzle or perforated plate 11 in the lower region of said first zone 2. Some of the extractant is removed at 12 and sufficient fresh aminonitrile is added via 13 for the aminonitrile concentration in the extractant to be maintained within the desired range. Said first and second zones are heated via jacketed heating tubes 14 and 15, respectively. Between said first and second zones there is a constriction in the flow cross section 16, which together with the fact that the temperature in said first zone 2 is higher than in said second zone 3 prevents any sinking of the aminonitrile-comprising solution, which has a higher specific gravity.

Variant 1

The extractant is recirculated in the upper part of the extraction column. This upper part of the extraction zone constitutes from 5 to 90%, preferably 10–50%, particularly preferably 20–40%, of the total volume of the extractor. The extractant comprising the low molecular weight fractions is withdrawn at the top of the column and returned into the column in a certain part below the head by a distributing means uniformly over the cross section. The amount of extractant recirculated in the head is chosen so that, on the one hand, a temperature and concentration equilibration is ensured within the head and an intensive mass transfer takes place at the phase interface of the chip particles. Care must be taken to ensure that the flow rate of the aqueous solution does not exceed the swirling point of the chips. The velocity is preferably set within the range from 2 to 20 m/h, preferably within the range 3–15 m/h. To counteract the swirling up of the chips, the extractor head possesses a larger diameter than the lower part of the tube. A heat exchanger disposed within the head circuit outside the extraction tower is used to adjust the extraction temperature in the head and to heat up the incoming polyamide chips to the desired temperature. The temperature in the extractor head is preferably within the range from 80 to 140° C., preferably 100–130° C. The temperature should preferably be chosen in such a way that the polymer chips do not dissolve in the extractant and the boiling point of the extractant is not exceeded.

By adding liquid aminonitrile and optionally polyamide-forming monomers and/or oligomers at from 80 to 100° C. into the head circuit it is possible to set the upper part of the extraction zone to a concentration of aminonitrile and polyamide-forming monomers or oligomers which is within the range from 5 to 95% by weight, preferably within the range from 10 to 80% by weight, particularly preferably within the range from 15 to 70% by weight. This extractant composition must here be considered as the mean value of the concentrations in the head part of the extractor. The result is to speed up the removal of the low molecular weight constituents, especially monomers and oligomers, from the chips and also to leave the chips with a lower residual extractables content.

In the case of nylon-6 extraction and the extraction of polymer mixtures comprising nylon-6, for example, the removal of caprolactam and its oligomers is speeded up. If the polyamide has been obtained from aminonitriles, these aminonitriles and their oligomers can be removed.

Unlike existing processes, it is not caprolactam or pure water which is used, but an aqueous solution of aminonitriles and optionally polyamide-forming monomers and/or oligomers. The resulting products have a low residual level of low molecular weight constituents, especially of caprolactam dimer.

Variant 2

In a particularly preferred embodiment, the column is fitted beneath the head circuit with a flow barrier which, by narrowing the flow cross section in a specific manner, leads to an increase in the superficial flow velocity of the ascending liquid phase as a function of the extractant/chips ratio. This narrowing takes the form of a honeycomb-shaped constriction. This, on the one hand, prevents any sinking of the aqueous solution, which has a higher specific gravity, from the head part of the extractor into the tube part underneath. On the other, the narrowing of the flow cross section provides an effective means for separating the head part of the extractor, which is characterized by very pronounced backmixing as a result of recirculation, from the tubular part, in which a countercurrent concentration profile with little if any backmixing is desired.

Sinking of the heavier extract from the head part is further counteracted by maintaining the zone at the head of the extraction tower at a temperature which is from 5 to 40° C., preferably from 10 to 20° C., higher than the zone at the base of the extractor.

Furthermore, the flow velocity of the extractant is preferably kept high by making the tubular part as slender as possible. The superficial flow velocity should preferably be from 0.2 to 6 m/h, more preferably from 1 to 3 m/h. Owing to the comparatively short residence time and the consequently low extract volume, the tube cross section can be kept small without the extraction tower having to be built very tall at prohibitive expense.

The extraction of the present invention requires a lower water/chips ratio than the extraction with water.

This makes it possible, if desired, to reduce the amount of water which has to be evaporated in extract water workup, and this may be beneficial for the economics of the overall process.

The chips may be discharged from the extractor via conveyor screws or valves, for example. Preference is given to deep-drawn single screws which continuously meter the chips into the transportation water circuit. The speed of rotation of the screw controls the quantity of chips and hence the level of chips in the extraction tower. The addition of small quantities of water into the transportation water circuit, which enter the extractor through the screw, serves to create, in the screw, a flow of liquid which is countercurrent to the existing chips and at the same time ensures an upward flow of liquid phase in the base region of the extractor, too, preventing any backmixing.

Extractant

The aminonitrile in the mixture can be in principle any aminonitrile, i.e., any compound having both at least one amino group and at least one nitrile group. ω-Aminonitriles are preferred, especially ω-aminoalkyl nitriles having from 4 to 12 carbon atoms, more preferably 4 to 9 carbon atoms, in the alkylene moiety, or an aminoalkylaryl nitrile having from 8 to 13 carbon atoms, preferred aminoalkylaryl nitrites being aminoalkylaryl nitrites which have an alkyl spacer of at least one carbon atom between the aromatic unit and the amino and nitrile group. Especially preferred aminoalkylaryl nitrites are those which have the amino group and nitrile group in the 1,4 position relative to each other.

The ω-aminoalkyl nitrile used is preferably a linear ω-aminoalkyl nitrile in which the alkylene moiety (—$CH_2$—) preferably contains from 4 to 12 carbon atoms, more preferably from 4 to 9 carbon atoms, such as 6-amino-1-cyanopentane (6-aminocapronitrile), 7-amino-1-cyanohexane, 8-amino-1-cyanoheptane, 9-amino-1-cyanooctane, 10-amino-1-cyanononane, particularly preferably 6-aminocapronitrile. 6-Aminocapronitrile is customarily obtained by hydrogenation of adiponitrile according to known methods, described for example in DE-A 836,938, DE-A 848,654 or U.S. Pat. No. 5,151,543.

Of course, it is also possible to use mixtures of a plurality of aminonitriles or mixtures of an aminonitrile with further comonomers, such as caprolactam or the below-defined mixture. In one embodiment of the invention, the aqueous extractant is essentially or completely free of caprolactam at the start of the extraction.

Further suitable polyamide-forming monomers include for example dicarboxylic acids, such as alkanedicarboxylic acids having from 6 to 12 carbon atoms, especially from 6 to 10 carbon atoms, such as adipic acid, pimelic acid, suberic acid, azelaic acid or sebacic acid, and also terephthalic acid and isophthalic acid, diamines such as $C_{4-12}$-alkyldiamines, especially having 4 to 8 carbon atoms, such as hexamethylenediamine, tetra-methylenediamine or octamethylenediamine, also m-xylylenediamine, bis(4-aminophenyl)methane, 2,2-bis(4-aminophenyl)propane or bis(4-aminocyclohexyl)methane, 2,2-bis(4-aminophenyl)propane or bis(aminocyclohexyl)methane, and also mixtures of dicarboxylic acids and diamines each by itself in any desired combinations, but in relation to one another advantageously in an equivalent ratio. It is further possible to use salts of the aforementioned dicarboylic acids and diamines, such as hexamethylenediammonium adipate, hexamethylenediammonium terephthalate or tetramethylenediammonium adipate, hexamethylenediammonium terephthalate, but in particular the salt of adipic acid and hexamethylenediamine, hexamethylenediammonium adipate (66 salt).

Suitable dicarboxylic acids include aliphatic $C_4$–$C_{10}$-α,ω-dicarboxylic acids such as succinic acid, glutaric acid, adipic acid, pimelic acid, suberic acid, azelaic acid, sebacic acid, preferably adipic acid and sebacic acid, particularly preferably adipic acid, and aromatic $C_8$–$C_{12}$-dicarboxylic acids such as cyclo-hexane-dicarboxylic acid.

Suitable α,ω-diamines having from 4 to 10 carbon atoms include tetramethylenediamine, pentamethylenediamine, hexamethylenediamine, heptamethylenediamine, octamethylenediamine, nonamethylenediamine and decamethylenediamine, preferably hexamethylenediamine.

The α,ω-$C_2$–$C_{12}$-dinitrile used is preferably an aliphatic dinitrile such as 1,4-dicyanobutane (adiponitrile), 1,5-dicyanopentane, 1,6-dicyanohexane, 1,7-dicyanoheptane, 1,8-dicyanooctane, 1,9-dicyanononane, 1,10-dicyanodecane, particularly preferably adiponitrile.

If desired, it is also possible to use diamines, dinitriles and aminonitriles derived from branched alkylene or arylene or alkylarylene compounds.

The α,ω-$C_5$–$C_{12}$-amino acid used can be 5-aminopentanoic acid, 6-aminohexanoic acid, 7-aminoheptanoic acid, 8-aminooctanoic acid, 9-aminononanoic acid, 10-aminodecanoic acid, 11-aminoundecanoic acid or 12-aminododecanoic acid, preferably 6-amino hexanoic acid.

The extractant may preferably include, if desired, caprolactam and/or hexamethylenediammonium adipate ("salt") as polyamide-forming monomers as well as aminocapronitrile.

The foregoing compounds can also be used in the form of mixtures.

The ex traction of polyamide chips by means of caprolactam, as described in JP-A-72 26438, for example, is not sensible in the production of nylon-6 from aminocapronitrile, for example, since caprolactam is not a starting material in this case and consequently not inevitably available. For polyamides produced in this way, the novel extraction with aminocapronitrile and, if desired, a low proportion of caprolactam is preferred. The extract water obtained can be recycled into the feed stream directly or after only minimal concentrating.

If polycaprolactam is extracted, then the chips emerging from the extraction stage have a residual content of low molecular weight constituents of less than 1.5%, preferably less than 1.0%, particularly preferably less than 0.4%.

Moreover, extraction according to the present invention, involving the addition of aminocapronitrile, can lead to a high space-time yield and hence, if desired, to a shortening of the extraction time. The level of caprolactam dimer, the presence of which is undesirable for spinning applications, can be significantly lowered by the extraction.

It is possible to perform the extraction of the invention and a subsequent wash of the chips in just one apparatus. An advantageous apparatus for this purpose has a suitable reactor geometry (head part, tube part) with additional flow barrier and optimal flow velocity with temperature profile along the extraction column.

The disclosed process can lead to a better water/chips ratio ($\leq 0.8$) than for the extraction with water and so bring about a cost saving.

Embodiments of the invention will now be more particularly described by way of example.

EXAMPLES

Inventive Example 1

The unextracted nylon-6 chips used for the tests have a cylindrical shape measuring about 3 mm in diameter and about 2 mm in height. The caprolactam content is 7.8%, the dimer content 1.1%, and total residual extractables content 11.2%, based on the chips.

Procedure 100 g of chips are stirred at 95° C. with 1000 ml of 20% strength aminocapronitrile solution. Samples are taken from the flask over a period of 4 hours. The chips are filtered off on a glass frit and the extractant is returned into the flask. The chips are then washed twice with 20 ml of water each time and dried under reduced pressure at 60° C. for 16 hours. The chips thus obtained are subjected to a measurement of residual extractables. The values obtained are summarized in Table 1 below.

TABLE 1

Extraction test with 20% strength ACN solution

| Extraction time [min] | Level of low molecular weight constituents based on total mass of polymer [% by weight] | | |
|---|---|---|---|
| | Caprolactam monomer | Caprolactam dimer | Caprolactam trimer |
| 10 | 5.79 | 1.03 | 0.41 |
| 30 | 3.50 | 0.67 | 0.33 |
| 60 | 2.51 | 0.63 | 0.16 |
| 120 | 0.94 | 0.42 | 0.21 |
| 240 | 0.43 | 0.32 | 0.11 |

Comparative Example C 100 g of chips are stirred at 95° C. with 1000 ml of water. Samples are taken from the flask over a period of 4 hours. The chips are filtered off on a glass frit and the extractant is returned into the flask. The chips are then washed twice with 20 ml of water each time and dried under reduced pressure at 60° C. for 16 hours.

The chips thus obtained are subjected to a measurement of residual extractables. The values obtained are summarized in Table 2 below.

TABLE 2

Extraction test with water

| Extraction time [min] | Level of low molecular weight constituents based on total mass of polymer [% by weight] | | |
|---|---|---|---|
| | Caprolactam monomer | Caprolactam dimer | Caprolactam trimer |
| 10 | 5.76 | 1.07 | 0.43 |
| 30 | 4.23 | 0.81 | 0.20 |
| 60 | 3.00 | 0.78 | 0.31 |
| 120 | 1.54 | 0.62 | 0.15 |
| 240 | 0.73 | 0.52 | 0.21 |

We claim:

1. A process for removing low molecular weight extractables from polyamide-6 particles, which comprises: contacting the particles with an aqueous extractant solution containing 5 to 95% by weight of aminonitriles, based on the total weight of the aqueous solution.

2. A process for preparing polyamide particles by polymerizing aminonitriles and removing low molecular weight extractables from the obtained polyamide particles using an aqueous extractant solution containing 5 to 95% by weight of aminonitriles, based on the total weight of the aqueous solution.

3. A process as claimed in claim 1, wherein the aminonitriles used are ω-aminonitriles.

4. A process as claimed in claim 3, wherein the ω-aminonitriles used are ω-aminoalkyl used are ω-aminoalkyl nitriles.

5. A process as claimed in claim 1, wherein the extraction is carried out continuously and the polyamide-6 particles and the aqueous extractant solution are passed countercurrently.

6. A process as claimed in claim 5, wherein the extraction is carried out in an extraction column divided into two zones, wherein, in the first zone, aqueous extractant is removed from a top part of said first zone and reintroduced into a bottom part of said first zone, and, in the second zone, water is fed into said second zone from a bottom part of said second zone, and in a countercurrent direction relative to the polyamide particle flow, said water then mixing with the aqueous extract introduced into the bottom part of said first zone.

* * * * *